(12) United States Patent
Hirata et al.

(10) Patent No.: US 9,738,037 B2
(45) Date of Patent: Aug. 22, 2017

(54) METHOD AND APPARATUS FOR PRODUCING THREE-DIMENSIONALLY SHAPED OBJECT AND THREE-DIMENSIONALLY SHAPED OBJECT

(71) Applicant: Seiko Epson Corporation, Tokyo (JP)

(72) Inventors: Koki Hirata, Matsumoto (JP); Shinichi Kato, Matsumoto (JP); Hiroshi Fukumoto, Shiojiri (JP); Chigusa Sato, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/947,110

(22) Filed: Nov. 20, 2015

(65) Prior Publication Data

US 2016/0144573 A1 May 26, 2016

(30) Foreign Application Priority Data

Nov. 25, 2014 (JP) ................. 2014-238030

(51) Int. Cl.
| | |
|---|---|
| *B29C 67/00* | (2017.01) |
| *B33Y 50/02* | (2015.01) |
| *B28B 1/00* | (2006.01) |
| *B33Y 10/00* | (2015.01) |
| *B28B 7/46* | (2006.01) |
| *B29K 105/00* | (2006.01) |
| *B29C 35/08* | (2006.01) |

(52) U.S. Cl.
CPC .......... *B29C 67/0088* (2013.01); *B28B 1/001* (2013.01); *B28B 7/465* (2013.01); *B29C 67/0081* (2013.01); *B33Y 50/02* (2014.12); *B29C 2035/0827* (2013.01); *B29K 2105/251* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 5,204,055 A | 4/1993 | Sachs et al. | |
| 8,425,816 B2* | 4/2013 | Okamoto | C08L 83/04 264/109 |
| 2002/0079601 A1* | 6/2002 | Russell | B29C 41/12 264/40.1 |
| 2010/0121476 A1* | 5/2010 | Kritchman | B29C 67/0051 700/119 |
| 2015/0273520 A1* | 10/2015 | Okamoto | B41J 2/0456 428/172 |
| 2016/0349724 A1* | 12/2016 | Cortes | G05B 17/02 |

FOREIGN PATENT DOCUMENTS

| | | |
|---|---|---|
| JP | 06-218712 A | 8/1994 |
| JP | 2011-230422 A | 11/2011 |

* cited by examiner

*Primary Examiner* — Mary F Theisen
(74) *Attorney, Agent, or Firm* — Harness, Dickey & Pierce, P.L.C.

(57) ABSTRACT

A method for producing a three-dimensionally shaped object by stacking layers includes forming each layer using a three-dimensional shape composition containing particles, measuring the thickness of the layer, and ejecting onto the layer a liquid binder containing a binding agent capable of binding the particles. For the ejecting, the amount of the liquid binder to be ejected per unit area of the layer when viewed from above is adjusted according to the result of the measuring.

13 Claims, 2 Drawing Sheets

METHOD AND APPARATUS FOR PRODUCING THREE-DIMENSIONALLY SHAPED OBJECT AND THREE-DIMENSIONALLY SHAPED OBJECT

BACKGROUND

1. Technical Field

The present invention relates to a method and an apparatus for producing a three-dimensionally shaped object and a three-dimensionally shaped object.

2. Related Art

For example, JP-A-6-218712 discloses a method of shaping a three-dimensional object while solidifying a powder with a liquid binder. In this method, the three-dimensional object is formed by repeating the sequence of the following operations. First, a powder is spread to form a powder layer having a uniform thickness, and a liquid binder is ejected onto a desired portion of the powder layer to bind the powder particles. Consequently, only the powder particles in the portion of the powder layer onto which the liquid binder has been ejected are bound to form a thin plate-like member (hereinafter referred to as the "cross-section member"). On this powder layer, then, a further thin powder layer is formed, and a liquid binder (curable ink) is ejected onto a desired portion of this further powder layer. Consequently, another cross-section member is formed in the portion of the further powder layer onto which the liquid binder has been ejected. At this time, the liquid binder ejected onto the powder layer penetrates into the previously formed cross-section member, so that the newly formed cross-section member is bound to the previously formed cross-section member. By repeating the sequence of these operations, thin plate-like cross-section members are formed one on top of another, thus forming a three-dimensional object.

This technique allows an object to be easily shaped by simply binding powder particles only using data of the three-dimensional shape of the object to be shaped. Also, this technique does not require preparing a molding die in advance, and accordingly enables fast inexpensive shaping of three-dimensional objects. Furthermore, since the thin plate-like cross-section members are formed one by one, even a complicated object having an internal structure can be formed in one body without combining a plurality of components.

In the known method, however, the same amount of a liquid binder is applied to each powder layer even if the thickness of the powder layers has variations. This amount of the liquid binder may be excessively small or excessively large depending on the portion of the powder layer. This can cause powder particles in some portions to fail to bind to each other. Consequently, the mechanical strength of the resulting three-dimensionally shaped object is reduced.

SUMMARY

An advantage of some aspects of the invention is that it provides a method and an apparatus for efficiently producing a three-dimensionally shaped object having a high mechanical strength, and also provides a three-dimensionally shaped object having a high mechanical strength.

According to an aspect of the invention, there is provided a method for producing a three-dimensionally shaped object by stacking layers. The method includes forming each layer using a three-dimensional shape composition containing particles, measuring the thickness of the layer, and ejecting onto the layers a liquid binder containing a binding agent capable of binding the particles. For the ejecting, the amount of the liquid binder to be ejected per unit area of the layer when viewed from above is adjusted according to the result of the measuring.

This method can efficiently produce a three-dimensionally shaped object having a high mechanical strength.

The amount of the liquid binder may be adjusted by varying the number of droplets of the liquid binder to be ejected. Thus a three-dimensionally shaped object having a high mechanical strength can be efficiently produced.

Alternatively, the amount of the liquid binder may be adjusted by varying the weight of droplets of the liquid binder to be ejected. Thus a three-dimensionally shaped object having a high mechanical strength can be efficiently produced.

Preferably, the measuring of the thickness is performed with a non-contact measuring device. Consequently, the resulting three-dimensionally shaped object has a higher dimensional accuracy.

The three-dimensional shape composition may contain a solvent. In this instance, preferably, the method further includes heating the layer to remove at least part of the solvent in the layer before the measuring of the thickness. Consequently, the resulting three-dimensionally shaped object has a higher mechanical strength and a higher dimensional accuracy.

The method may further include irradiating with UV light the layer onto which the liquid binder has been ejected, thereby curing the binding agent in the liquid binder. In this instance, the amount of the irradiation per unit area of the layer when viewed from above may be adjusted according to the result of the measuring.

Consequently, the resulting three-dimensionally shaped object has a higher mechanical strength and a higher dimensional accuracy.

According to another aspect of the invention, there is provided an apparatus adapted to produce a three-dimensionally shaped object by stacking layers. The apparatus includes a layer-forming device that forms each layer using a three-dimensional shape composition containing particles, a thickness-measuring device that measures the thickness of the layer, and an ejection device that ejects onto the layer a liquid binder containing a binding agent capable of binding the particles. The ejection device is configured to adjust the amount of the liquid binder to be ejected per unit area of the layer when viewed from above according to the thickness measured by the thickness-measuring device. The apparatus can efficiently produce a three-dimensionally shaped object having a high mechanical strength.

A three-dimensionally shaped object produced by the above-described method is also provided. The three-dimensionally shaped object has a high mechanical strength.

A three-dimensionally shaped object produced with the above-described apparatus is also provided. The three-dimensionally shaped object has a high mechanical strength.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be described in detail with reference to the attached drawings.
1. Three-Dimensionally Shaped Object Producing Apparatus An embodiment of the apparatus adapted to produce a three-dimensionally shaped object (hereinafter referred to as the three-dimensionally shaped object producing apparatus) will first be described.

Figure 1:
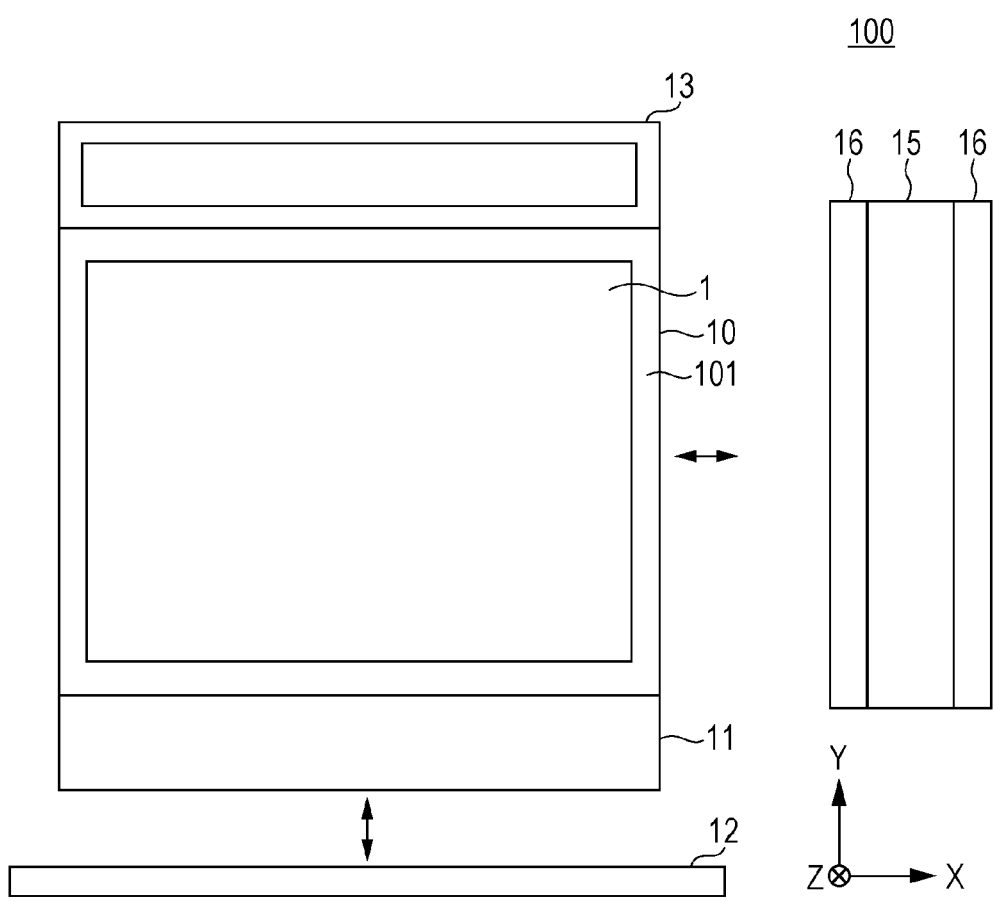
FIG. 1 is a plan view of an apparatus adapted to produce a three-dimensionally shaped object, according to an embodiment of the invention.
Figure 2:
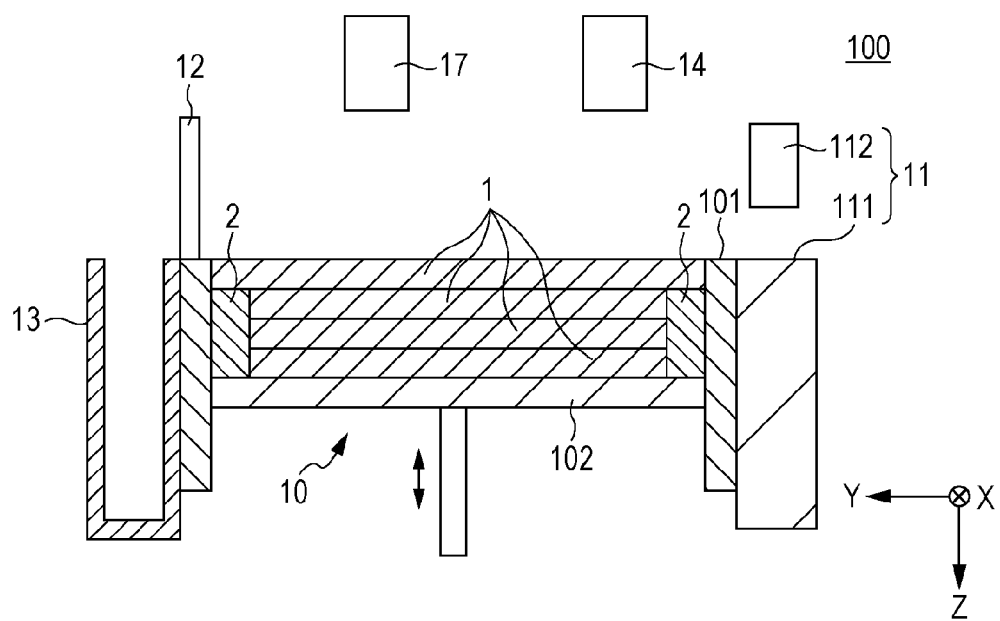
FIG. 2 is a sectional view of the apparatus shown in FIG. 1, viewed from the left side of FIG. 1.

FIG. 1 is a plan view of the three-dimensionally shaped object producing apparatus according to a preferred embodiment of the invention, and FIG. 2 is a sectional view of the apparatus shown in FIG. 1, viewed from the left side of FIG. 1.

The three-dimensionally shaped object producing apparatus 100 is intended to produce a three-dimensionally shaped object by stacking layers 1 made of a three-dimensional shape composition containing particles.

As shown in FIGS. 1 and 2, the three-dimensionally shaped object producing apparatus 100 includes a shaping portion 10 in which a three-dimensionally shaped object is formed, a supply portion 11 from which a three-dimensional shape composition is supplied, a squeegee (layer-forming device) 12 that forms a layer 1 of the three-dimensional shape composition on the shaping portion 10 using the three-dimensional shape composition supplied thereto, and collecting portion 13 that collects the excess three-dimensional shape composition remaining after the layer 1 has been formed, a heating device 17 that heats the layer 1, a thickness-measuring device 14 that measures the thickness of the layer 1, an ejection portion 15 that ejects a liquid binder containing a binding agent onto the layer 1, and a UV irradiation device 16 that irradiates the layer 1 with UV light. The three-dimensional shape composition and the liquid binder will be described later in detail.

As shown in FIGS. 1 and 2, the shaping portion 10 includes a frame 101 and a shaping stage 102 disposed inside the frame 101.

The frame 101 includes a frame member. The shaping stage 102 is rectangular in an X-Y plane.

The shaping stage 102 is configured to be moved (elevated) in the Z-axis direction by a driver (not shown). Each layer 1 is formed in the region defined by the inner wall of the frame 101 and the shaping stage 102.

The shaping portion 10 can be moved in the X-axis direction by a driver (not shown). When the shaping portion 10 has been moved in the X-axis direction, that is, to a drawing region of the ejection portion 15 that will be described later, the ejection portion 15 ejects the liquid binder onto the layer 1.

The supply portion 11 has a function to supply the three-dimensional shape composition to the three-dimensionally shaped object producing apparatus 100.

The supply portion 11 includes a supply region 111 to which the three-dimensional shape composition is supplied, and a supplying device 112 that supplies the three-dimensional shape composition to the supply region 111.

The supply region 111 is long in the X-axis direction and is in contact along one side of the frame 101. Also, the supply region 111 is disposed so as to be flush with the upper surface of the frame 101.

The three-dimensional shape composition supplied to the supply region 111 is delivered to the shaping stage 102 by a squeegee 12 described below and used for forming the layer 1.

The squeegee (layer-forming device) 12 is a plate long in the X-axis direction. The squeegee 12 is configured to be moved in the Y-axis direction by a driver (not shown). One end in the shorter-axis direction of the squeegee 12 is configured to come into contact with the upper surface of the frame 101 and the supply region 111.

The squeegee 12 transports the three-dimensional shape composition supplied to the supply region 111 to the shaping stage 102 while moving in the Y-axis direction, and forms a layer 1 on the shaping stage 102.

In the present embodiment, the moving direction of the squeegee 12 intersects (perpendicularly) the moving direction of the shaping portion 10. This structure allows preparation for the formation of a subsequent layer 1 while the ejection portion 15 is ejecting the liquid binder, thus increasing the efficiency of three-dimensionally shaped object production.

The collecting portion 13 is a box-like member whose upper side is open, and is apart from the shaping portion 10. The collecting portion 13 has a function to collect the excess three-dimensional shape composition remaining after the formation of the layer 1.

The collecting portion 13 is adjacent to the frame 101 and opposes the supply portion 11 with the frame 101 therebetween.

The excess three-dimensional shape composition transported by the squeegee 12 is collected in the collecting portion 13, and the collected three-dimensional shape composition is reused.

The heating device 17 heats the layer 1 to dry the layer 1. For example, if the three-dimensional shape composition contains a solvent, the heating device 17 can removed at least part of the solvent. The thickness-measuring device 14 has a function to measure the thickness of the layer 1.

The thickness-measuring device 14 may be a non-contact types, such as a laser displacement gauge or a measuring device using image processing with a CCD camera, or a contact types, such as a stylus profilometer. Non-contact measuring devices are advantageous. Non-contact measuring devices prevent the surface state of the layer 1 from being inadvertently changed. Consequently, the resulting three-dimensionally shaped object has a higher dimensional accuracy. In addition, non-contact measuring devices can measure the thickness of a layer of, for example, a three-dimensional shape composition containing a solvent, and accordingly can start the measurement while the layer 1 is being formed, thus helping produce the three-dimensionally shaped object efficiently with high dimensional accuracy.

For measuring the thickness of the layer 1, the thickness-measuring device 14 measures, for example, the distance from the upper surface of the frame 101 (reference level) to the surface of the layer 1, and thickness is calculated from the measured distance and the distance of one movement of the shaping stage 102 in the Z-axis direction. The ejection portion 15 has a function to eject the liquid binder onto the layer 1.

More specifically, the shaping portion 10 in which the layer 1 has been formed on the shaping stage 102 is moved in the X-axis direction. As the shaping portion 10 comes close to the drawing region under the ejection portion 15, the liquid binder is ejected onto the layer 1 from the ejection portion 15.

The ejection portion 15, which is of ink jet type, includes a liquid ejecting head that ejects the liquid binder in the form of droplets. The ejection portion 15 also includes a liquid binder supply portion (not shown). In the present embodiment, the liquid ejecting head is piezoelectrically driven.

For measuring the thickness of the n-th layer 1, it is preferable that the thickness-measuring device 14 scan the region of the (n−1)th layer 1, underlying the n-th layer, where the liquid binder has been ejected. This helps the resulting three-dimensionally shaped object have a high dimensional accuracy.

In addition, the ejection portion 15 is configured to adjust the amount of the liquid binder to be ejected per unit area of the layer 1 when viewed from above, according to the result of the measurement by the thickness-measuring device 14.

For example, if the average thickness obtained as the result of the measurement by the thickness-measuring device 14 is larger than an intended thickness, the ejection amount per unit area is increased; if the average thickness is smaller than an intended thickness, the ejection amount per unit area is reduced.

Also, the ejection amount per unit area may be adjusted according to the thickness distribution of the corresponding layer obtained as the result of the measurement by the thickness-measuring device 14. The ejection amount per unit area is increased for a region where the thickness is larger than a reference value; the ejection amount per unit area is reduced for a region where the thickness is smaller than the reference value.

By adjusting the amount of the liquid binder to be ejected according to the result of thickness measurement, an amount of the liquid binder appropriate to the thickness of the layer 1 can be applied. Thus, the particles in the layer 1 are prevented from failing to bind to each other. Consequently, the resulting three-dimensionally shaped object exhibits a high mechanical strength. In addition, unevenness of the thickness resulting from an excessive application of the liquid binder to the layer 1 can be reduced, and accordingly, the resulting three-dimensionally shaped object has a high dimensional accuracy.

After the amount of the liquid binder to be ejected has been adjusted according to the result of thickness measurement and, then, an amount of the liquid binder appropriate to the thickness of the layer 1 has been applied, the thickness of the layer to be subsequently formed is adjusted. For example, if the thickness of the n-th layer is smaller than a predetermined value, an adjusted amount of the liquid binder is ejected onto the n-th layer, and then the distance of the shaping stage 102 to be moved in the Z-axis direction is increased for forming the (n+1)th layer so that the thickness of the (n+1)th layer can become larger than a predetermined value. Then, an amount of the liquid binder appropriate to the thickness of the (n+1)th layer is applied according to the result of the thickness measurement for the (n+1)th layer. Consequently, the resulting three-dimensionally shaped object has a high dimensional accuracy.

The amount of the liquid binder to be ejected may be adjusted by varying the number of droplets of the liquid binder per unit area of the layer 1 when viewed from above, or by varying the weight of droplets of the liquid binder. The adjustment in such a manner allows a three-dimensionally shaped object having a high mechanical strength to be efficiently produced.

Two UV irradiation devices 16 are provided so as to be disposed on each side of the ejection portion 15 in the moving direction.

Each UV irradiation device 16 has a function to irradiate the layer 1 with UV light so that the binding agent in the layer 1 can be cured to bind the particles in the layer 1 to each other.

The UV irradiation divide 16 is configured to adjust the amount of UV light therefrom per unit area of the layer 1 when viewed from above according to the result of the measurement by the thickness-measuring device 14. Thus, the particles in the layer 1 can be bound to each other with reliability. Consequently, the apparatus can more efficiently produce a three-dimensionally shaped object having a high mechanical strength.

For example, if the average thickness obtained as the result of the measurement by the thickness-measuring device 14 is larger than an intended thickness, the amount of UV irradiation per unit area is increased; if the average thickness is smaller than an intended thickness, the amount of UV irradiation per unit area is reduced.

Also, the amount of UV irradiation per unit area is increased for a region where the thickness is larger than a reference value based on the thickness distribution of the corresponding layer 1 obtained as the result of the measurement by the thickness-measuring device 14; the amount of UV irradiation per unit area is reduced for a region where the thickness is smaller than the reference value. For increasing the amount of UV irradiation, the irradiation intensity of the UV irradiation device 16 may be increased, or the speed of the shaping portion 10 moving in the X-axis direction, that is, the speed at which the shaping portion passes under the UV irradiation device 16, may be reduced. For reducing the amount of UV irradiation, the irradiation intensity of the UV irradiation device 16 may be reduced, or the speed of the shaping portion 10 moving in the X-axis direction, that is, the speed at which the shaping portion 10 passes under the UV irradiation device 16, may be increased.

Although the present embodiment describes a case of using the squeegee 12 as the layer-forming device, the layer-forming device is not limited to the squeegee and may be, for example, a roller.

The collecting portion 13 may be provided with a removing device capable of removing the three-dimensional shape composition attached to the squeegee 12. The removing device may be of ultrasonic waves, wiping, or static electricity.

If the three-dimensional shape composition does not contain a solvent, the heating device 17 may be omitted.

The UV irradiation device 16 is also not necessarily provided. For example, if the liquid binder contains a thermosetting resin, the UV irradiation device may be replaced with a heating device.

2. Method for Producing Three-Dimensionally Shaped Object

In the method for producing a three-dimensionally shaped object according to an embodiment of the invention, the three-dimensionally shaped object is produced by stacking layers of a three-dimensional shape composition containing three-dimensional shape particles.

The method of an embodiment includes forming each of the layers 1 using a three-dimensional shape composition containing particles, heating the layer 1, measuring the thickness of the layer 1, ejecting a liquid binder onto the layer 1, and irradiating the layer 1 with UV light.

A process of the method using the above-described three-dimensionally shaped object producing apparatus 100 will now be described in detail.

First, a three-dimensional shape composition is supplied to the supply region 111 with the supplying device 112. Then the three-dimensional shape composition supplied to the supply region 111 is delivered to the shaping stage 102 by the squeegee 12 and used for forming a layer 1 (operation of forming each layer).

The thickness of the layer 1 is not particularly limited, and may be in the range of 30 µm to 500 µm, preferably in the range of 70 µm to 150 µm. The formation of layers having such a thickness enhances the productivity of the three-dimensionally shaped object and is effective in preventing undesirable unevenness in the resulting three-dimensionally shaped object. Also, the resulting three-dimensionally shaped object can exhibit a particularly high dimensional accuracy. After the formation of the layer 1, the collecting portion 13 collects the remaining three-dimensional shape composition.

Subsequently, the layer 1 is heated to remove solvent from the layer 1 (operation of heating). Then, the thickness of the layer 1 is measured with the thickness-measuring device 14 (operation of measuring thickness).

Subsequently, the shaping portion 10 on which the layer 1 has been formed is moved in the X-axis direction, and the liquid binder is ejected onto the layer 1 in the drawing region defined by the ejection portion 15 (operation of ejecting). As described above, in this operation of ejecting, the amount of the liquid binder to be ejected per unit area of the layer 1 when viewed from above is adjusted according to the result of the measurement performed in the operation of measuring thickness. Thus, an amount of the liquid binder appropriate to the thickness of the layer 1 can be applied, and the particles in the layer 1 are prevented from failing to bind to each other. Consequently, the resulting three-dimensionally shaped object exhibits a high mechanical strength. In addition, unevenness of the thickness resulting from an excessive application of the liquid binder to the layer 1 can be reduced, and accordingly, the resulting three-dimensionally shaped object has a high dimensional accuracy.

Subsequently, the UV irradiation device irradiates the layer 1 with UV light to cure the binding agent in the layer 1, thereby forming a hardened layer 1 and an unhardened portion 2 (operation of irradiating with UV light).

Then, the shaping stage 102 is lowered in the Z-axis direction by a distance equivalent to the thickness of the layer 1 to be subsequently formed, and the sequence of the above-described operations is repeated. Thus, a three-dimensionally shaped object is produced.

The resulting three-dimensionally shaped object particularly has a high mechanical strength and a high dimensional accuracy.

3. Three-Dimensional Shape Composition

The three-dimensional shape composition will now be described in in detail. The three-dimensional shape composition contains a plurality of particles.

The constituents of the composition will be described in detail below.

Particles

Although any type of particles may be used, porous particles are preferred. Porous particles allow the binding agent in the liquid binder to favorably penetrate the pores thereof during the process of producing the three-dimensionally shaped object. Consequently, the resulting three-dimensionally shaped object has a high mechanical strength.

The particles may be made of an inorganic material, an organic material, or a composite of an inorganic material and an organic material.

The inorganic material of the particles may be an elemental metal or a metal compound. Examples of the metal compound include metal oxides, such as silica, alumina, titanium oxide, zinc oxide, zirconium oxide, tin oxide, magnesium oxide, and potassium titanate; metal hydroxides, such as magnesium hydroxide, aluminum hydroxide, and calcium hydroxide; metal nitrides, such as silicon nitride, titanium nitride, and aluminum nitride; metal carbides, such silicon carbide and titanium carbide; metal sulfides, such as zinc sulfide; metal carbonates, such as calcium carbonate and magnesium carbonate; sulfates, such as calcium sulfate and magnesium sulfate; silicates, such as calcium silicate and magnesium silicate; phosphates, such as calcium phosphate; borates, such as aluminum borate and magnesium borate; and composites of these compounds.

The organic material of the particles may be a synthesized resin or a natural resin, and examples thereof include polyethylene resin, polypropylene, polyethylene oxide, polypropylene oxide, polyethylene imine, polystyrene, polyurethane, polyurea, polyester, silicone resin, acrylic silicone resin, polymethyl methacrylate and other polymers containing (meth)acrylate as a monomer, crosspolymer (for example, ethylene-acrylic acid copolymer resin) containing a (meth)acrylic ester as a monomer, such as methyl methacrylate crosspolymer, polyamide resin, such as nylon 12, nylon 6, and copolymerized nylon, polyimide, carboxymethylcellulose, gelatin, starch, chitin, and chitosan.

Preferably, the particles are made of an inorganic material, and metal oxide, particularly silica, is more preferred. The use of such inorganic materials helps the resulting three-dimensionally shaped object have a high mechanical strength. In particular, silica is superior in fluidity and accordingly advantageous for forming layers having a more uniform thickness. Also, the use of silica enhances the productivity of the three-dimensionally shaped object and allows the resulting three-dimensionally shaped object to have a still higher dimensional accuracy. Furthermore, particles made of silica prevent light scattering at the surface of the resulting three-dimensionally shaped object effectively. Silica particles generally have hydroxy groups at the surfaces thereof and are advantageous for use. Silica is commercially available.

The average particle size of the particles may be, but is not limited to, in the range of 1 µm to 25 µm, and preferably in the range of 1 µm to 15 µm. The use of such particles particularly increases the mechanical strength of the resulting three-dimensionally shaped object and is effective in preventing undesirable unevenness in the three-dimensionally shaped object. Also, the dimensional accuracy of the three-dimensionally shaped object can be particularly increased. Furthermore, such particles and the three-dimensional shape composition containing such particles exhibit particularly high fluidity, accordingly increasing the productivity of the three-dimensionally shaped object The average particle size mentioned herein is on a volume basis, and may be estimated by measuring a sample dispersion with a Coulter Counter particle size distribution meter TA-II (manufactured by COULTER ELECTRONICS INS) with an aperture of 50 µm. The sample dispersion is prepared by dispersing a sample in methanol for 3 minutes with an ultrasonic disperser.

The maximum particle size $D_{max}$ of the particles is preferably in the range of 3 µm to 40 µm, and more preferably 5 µm to 30 µm. The use of such particles particularly increases the mechanical strength of the resulting three-dimensionally shaped object and is effective in preventing undesirable unevenness in the three-dimensionally shaped object. Also, the dimensional accuracy of the three-dimensionally shaped object can be particularly increased. Furthermore, such particles and the three-dimensional shape composition containing such particles exhibit particularly high fluidity, accordingly increasing the productivity of the three-dimensionally shaped object Such particles also prevent light scattering at the surface of the resulting three-dimensionally shaped object effectively.

The particles may have any shape and are preferably spherical. Such particles and the three-dimensional shape composition containing such particles exhibit particularly high fluidity, accordingly increasing the productivity of the three-dimensionally shaped object. In addition, the use of such particles is effective in preventing undesirable unevenness in the three-dimensionally shaped object and allows the resulting three-dimensionally shaped object to have a particularly high dimensional accuracy. Such particles also prevent light scattering at the surface of the resulting three-dimensionally shaped object effectively.

The particle content in the three-dimensional shape composition is preferably in the range of 10% to 90% by mass, and more preferably in the range of 15% to 58% by mass. The particles may be porous. The suitable bulk density of the particles is in the range of about 0.1 g/cm$^3$ to 1.0 g/cm$^3$, and preferably, a porous powder having a bulk density in the range of 0.15 g/cm$^3$ to 0.5 g/cm$^3$ is used. The use of such particles satisfactorily increases the fluidity of the three-dimensional shape composition and helps the resulting three-dimensionally shaped object have a mechanical strength.

Water-Soluble Resin

The three-dimensional shape composition may contain a water-soluble resin in addition to the particles. The water-soluble resin can bind (temporarily fix) particles to each other to prevent the particles effectively from scattering undesirably. The use of a water-soluble resin can improve the safety of the worker and help the resulting three-dimensionally shaped object have a high dimensional accuracy. In addition, the water-soluble resin can easily cover the surfaces of the particles because of good affinity therebetween.

The water-soluble resin is soluble at least in part in water, and, for example, the solubility of the water-soluble resin in water (mass thereof that can be dissolved in 100 g of water) at 25° C. is desirably 5 (g/100 g of water) or more, more desirably 10 (g/100 g of water) or more. Such a water-soluble resin exhibits a higher affinity with the surfaces of the particles and facilitates the removal of unbound particles.

Preferably, the water-soluble resin in the three-dimensional shape composition is in a liquid form (for example, the form of being dissolved or being melted) at least during the operation of forming the layer. The water-soluble resin in such a state helps the layer 1 of the three-dimensional shape composition have a more uniform thickness with reliability.

Preferably, the water-soluble resin contains at least one resin selected from the group consisting of polyvinyl alcohol, polyvinyl pyrrolidone, sodium polyacrylate, ammonium polyacrylate, carboxymethyl cellulose, hydroxyethyl cellulose, polyethylene oxide, polyethylene glycol, polyacrylamide, and polyethyleneimine. Such a water-soluble resin exhibits a higher affinity with the particles (thus facilitating the formation of hydrogen bonds between the water-soluble functional group of the water-soluble rein and the hydroxyl, carboxy, or amino groups at the surfaces of the particles).

In addition, since the water-soluble resin has a hydroxy group and exhibits a high affinity with (high solubility in) aqueous solvents, accordingly easily dissolved uniformly. The water-soluble resin content in the three-dimensional shape composition is preferably 15% by volume or less, and more preferably in the range of 2% by volume to 5% by volume. The water-soluble resin with such a content can satisfactorily exhibit the functions thereof and ensure spaces the liquid binder penetrates. Consequently, the resulting three-dimensionally shaped object can exhibit a particularly high mechanical strength.

Aqueous Solvent

The three-dimensional shape composition may contain a solvent. The solvent can increase the fluidity of the three-dimensional shape composition and the productivity of the three-dimensionally shaped object.

The solvent used in the three-dimensional shape composition is not particularly limited, but is preferably aqueous. The aqueous solvent is water, a liquid compatible with water, or a mixture thereof. Preferably, the aqueous solvent mainly contains water and more preferably with a content of 70% by weight or more, still more preferably with a content of 90% by weight or more. The aqueous solvent can certainly dissolve the water-soluble resin and helps the layers 1 of the three-dimensional shape composition have a more uniform thickness. Also, water can be easily removed from the layer 1 and is, in addition, unlikely to adversely affect the resulting three-dimensionally shaped object even if it remains in the shaped object. Water is also advantageous in terms of safety for the human body, environmental issues, and the like.

The solvent content in the three-dimensional shape composition is preferably in the range of 5% by mass to 75% by mass, and more preferably in the range of 35% by mass to 70% by mass. The solvent with such a content can markedly produce the effects as described above, and can be removed in a short time during the process of producing the three-dimensionally shaped object, thus advantageous for increasing the productivity of the three-dimensionally shaped object.

If the three-dimensional shape composition contains water as a solvent, the water content in the composition is preferably in the range of 20% by mass to 73% by mass, and more preferably in the range of 50% by mass to 70% by mass. Such presence of water can markedly produce the above-described effect.

Other Constituents

The three-dimensional shape composition may further contain other constituents. Examples of constituents include a polymerization initiator, a polymerization promoter, a penetration enhancer, a wetting agent (moisturizing agent), a fixing agent, a fungicide, a preservative, an antioxidant, an ultraviolet absorbent, a chelating agent, and a pH adjuster.

4. Liquid Binder

The liquid binder will now be described in in detail.

Binding Agent

The liquid binder contains at least a binding agent. The binding agent is a component having a function to be cured so as to bind particles.

The binding resin may be, for example, a thermoplastic resin; a thermosetting resin; a photo-curable resins such as a visible light-curable resin (photo-curable resin in a narrow sense) capable of being cured with visible light, a UV-curable resin, or an IR-curable resin; or an X-ray radiation-curable resin. These resins may be used singly or in combination. In view of the mechanical strength of the resulting three-dimensionally shaped object and the productivity of the three-dimensionally shaped object, curable resins are advantageous as the binding agent. In view of the mechanical strength of the resulting three-dimensionally shaped object, the productivity of the three-dimensionally shaped object, and the storage stability of the liquid binder, UV-curable resins (polymerizable compounds) are particularly advantageous.

Preferably, the UV-curable resin is a resin that can form a polymer by an addition polymerization or ring-opening polymerization induced by radicals or cations produced from a photopolymerization initiator by UV irradiation. The addition polymerization may be a radical polymerization, a cationic polymerization, an anionic polymerization, a metathesis polymerization, or a coordination polymerization. The ring-opening polymerization may be a cationic polymerization, an anionic polymerization, a radical polymerization, a metathesis polymerization, or a coordination polymerization.

Addition-polymerizable compounds include compounds having at least one ethylenically unsaturated double bond in the molecule. A compound containing at least one terminal ethylenically unsaturated bond, preferably two or more terminal ethylenically unsaturated bonds, can be suitably used as the addition-polymerizable compound.

The ethylenically unsaturated polymerizable compound may be a monofunctional polymerizable compound, a polyfunctional polymerizable compound, or a mixture thereof. Examples of the monofunctional polymerizable compound include unsaturated carboxylic acids, such as acrylic acid, methacrylic acid, itaconic acid, crotonic acid, isocrotonic acid, and maleic acid; esters thereof; and amides. Examples of the polyfunctional polymerizable compound include esters of an unsaturated carboxylic acid and an aliphatic polyhydric alcohol, and amides of an unsaturated carboxylic acid and a polyvalent aliphatic amine compound.

The polyfunctional polymerizable compound may be a product of an addition reaction between an unsaturated carboxylic acid ester or amide having a nucleophilic substituent, such as a hydroxy group, an amino group, or a mercapto group, and an isocyanate or an epoxy, or a product of a dehydration or condensation of the unsaturated carboxylic acid ester or amide with a carboxylic acid. Also, the polyfunctional polymerizable compound may be a product of an addition reaction between an unsaturated carboxylic acid or amide having an electrophilic substituent, such as an isocyanate group or an epoxy group and an alcohol, an amine or a thiol, or a produce of a substitution reaction between an unsaturated carboxylic acid ester or amide having an eliminable substituent, such as a halogen atom, a tosyloxy group, and an alcohol, an amine or a thiol.

Typical examples of esters of an unsaturated carboxylic acid and an aliphatic polyhydric alcohol, which are radically polymerizable compounds, include monofunctional or polyfunctional (meth)acrylic acid esters.

Exemplary monofunctional (meth)acrylates include phenoxyethyl(meth)acrylate, phenyloxyethyl(meth)acrylate, cyclohexyl(meth)acrylate, ethyl(meth)acrylate, methyl(meth)acrylate, isobornyl(meth)acrylate, tetrahydrofurfuryl(meth)acrylate, and 4-hydroxybutyl(meth)acrylate.

Exemplary bifunctional (meth)acrylates include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, dipentaerythritol di(meth)acrylate, 2-[2-vyniloxy(ethoxy)ethyl (meth)acrylate, dipropylene glycol diacrylate, tripropylene glycol, and diacrylate.

Exemplary trifunctional (meth)acrylates include trimethylolpropane tri(meth)acrylate, trimethylolethane tri(meth)acrylate, alkylene oxide-modified trimethylolpropane tri(meth)acrylate, pentaerythritol tri(meth)acrylate, dipentaerythritol tri(meth)acrylate, trimethylolpropane tri((meth)acryloyloxypropyl)ether, isocyanuric acid alkylene oxide-modified tri(meth)acrylate, propionic acid dipentaerythritol tri(meth)acrylate, tri((meth)acryloyloxyethyl)isocyanurate, hydroxypivalic aldehyde-modified dimethylolpropane tri(meth)acrylate, and sorbitol tri(meth)acrylate.

Exemplary tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Exemplary pentafunctional (meth)acrylates include sorbitol penta(meth)acrylate and dipentaerythritol penta(meth)acrylate.

Exemplary hexafunctional (meth)acrylates include dipentaerythritol hexa(meth)acrylate, sorbitol hexa(meth)acrylate, alkylene oxide-modified phosphazene hexa(meth)acrylate, and caprolactone-modified dipentaerythritol hexa(meth)acrylate.

Polymerizable compounds other than (meth)acrylates include itaconic acid esters, crotonic acid esters, isocrotonic acid esters, and maleic acid esters.

Itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Crotonic acid esters include ethylene glycol dicrotonate, tetramethylene glycol dicrotonate, pentaerythritol dicrotonate, and sorbitol tetracrotonate.

Isocrotonic acid esters include ethylene glycol diisocrotonate, pentaerythritol diisocrotonate, and sorbitol tetraisocrotonate.

Maleic acid esters include ethylene glycol dimaleate, triethylene glycol dimaleate, pentaerythritol dimaleate, and sorbitol tetramaleate.

Other esters may be used, and examples thereof include aliphatic alcohol esters disclosed in JP-B-46-27926, JP-B-51-47334, and JP-A-57-196231, aromatic skeleton-including esters disclosed in JP-A-59-5240, JP-A-59-5241, and JP-A-2-226149, and amino-containing esters disclosed in JP-A-1-165613.

Examples of the amide monomer of an unsaturated carboxylic acid and a polyvalent aliphatic amine compound include methylenebisacrylamide, methylenebismethacrylamide, 1,6-hexamethylenebisacrylamide, 1,6-hexamethylenebismethacrylamide, diethylenetriamine trisacrylamide, xylylenebisacrylamide, and xylylenebismethacrylamide.

Preferred other amide monomers include amides having a cyclohexylene structure disclosed in JP-B-54-21726.

An urethane-based addition-polymerizable compound produced by addition reaction between an isocyanate and a hydroxy group may be advantageously used, and examples thereof include vinyl urethane compounds disclosed in JP-B-48-41708, containing two or more polymerizable vinyl groups, produced by adding a vinyl monomer containing a hydroxy group expressed by the following formula (1) to a polyisocyanate compound containing two or more isocyanate groups in the molecule.

$$CH_2=C(R^1)COOCH_2CH(R^2)OH \quad (1)$$

where $R^2$ and $R^2$ each represent H or $CH_3$.

In the present embodiment, a cationic ring-opening polymerizable compound having one or more cyclic ether group, such as an epoxy group or an oxetane group, in the molecule thereof may be suitably used as a UV curable resin (polymerizable compound).

The cationic polymerizable compound may be a curable compound containing a ring-opening polymerizable group and is preferably a heterocyclic group-containing curable compound. Examples of such a curable compound include cyclic imino ethers, such as epoxy derivatives, oxetane derivatives, tetrahydrofuran derivatives, cyclic lactone derivatives, cyclic carbonate derivatives, and oxazoline derivatives; and vinyl ethers. Epoxy derivatives, oxetane derivatives and vinyl ethers are preferred.

Examples of preferred epoxy derivatives include monofunctional glycidyl ethers, polyfunctional glycidyl ethers, monofunctional alicyclic epoxy compounds, and polyfunctional alicyclic epoxy compounds.

Examples of the glycidyl ethers include diglycidyl ethers, such as ethylene glycol diglycidyl ether and bisphenol A diglycidyl ether; trifunctional or more functional glycidyl ethers, such as trimethylolethane triglycidyl ether, trimethylolpropane triglycidyl ether, glycerol triglycidyl ether, and triglycidyl tris(hydroxyethyl)isocyanurate; tetrafunctional or more functional glycidyl ethers, such as sorbitol tetraglycidyl ether, pentaerythritol tetraglycidyl ether, polyglycidyl ether of cresol-novolak resin, and polyglycidyl ether of phenol-novolak resin; alicyclic epoxy compounds, such as Celloxide 2021P, Celloxide 2081, Epolead GT-301 and Epolead GT-401 (each produced by Daicel), EHPE (produced by Daicel), and polycyclohexyl epoxy methyl ether of phenol-novolak resin; and oxetane compounds, such as OX-SQ and PNOX-1009 (each produced by Toagosei).

Alicyclic epoxy derivatives are suitable as the polymerizable compound. The "alicyclic epoxy group" refers to a partial structure produced by epoxidizing a double bond in a cycloalkene ring, such as a cyclopentene group or a cyclohexene group, with an appropriate oxidizing agent, such as hydrogen peroxide or a peracid.

The alicyclic epoxy compound is preferably a polyfunctional epoxy compound containing two or more cyclohexene oxide group or cyclopentene oxide group in the molecule thereof. Examples of the alicyclic epoxy compound include 4-vinylcyclohexene dioxide, 3,4-epoxycyclohexylmethyl-3,4-epoxycyclohexyl carboxylate, di(3,4-epoxycyclohexyl)adipate, di(3,4-epoxycyclohexylmethyl)adipate, bis(2,3-epoxycyclopentyl)ether, di(2,3-epoxy-6-methylcyclohexylmethyl)adipate, and dicyclopentadiene dioxide.

A glycidyl compound containing a normal epoxy group having no aliphatic structure in the molecule thereof may be used singly or in combination with the alicyclic epoxy compound.

Such a glycidyl compound may be a glycidyl ether compound or a glycidyl ester compound. Preferably, a glycidyl ether compound is used in combination.

Examples of the glycidyl ether compound include aromatic glycidyl ether compounds, such as 1,3-bis(2,3-epoxypropyloxy)benzene, bisphenol A epoxy resin, bisphenol F epoxy resin, phenol novolak epoxy resin, cresol novolak epoxy resin, and trisphenolmethane epoxy resin; and aliphatic glycidyl ether compounds, such as 1,4-butanediol glycidyl ether, glycerol triglycidyl ether, propylene glycol diglycidyl ether, and trimethylolpropane triglycidyl ether. The glycidyl ester may be a glycidyl ester of linolenic acid dimer.

The polymerizable compound may be a compound containing an oxetanyl group that is a 4-membered cyclic ether (the compound hereinafter simply referred to as an oxetane compound). The oxetanyl group-containing compound contains at least one oxetanyl group in the molecule thereof.

The binding agent content in the liquid binder is preferably 80% by mass or more, and more preferably 85% by mass or more. The use of such a liquid binder helps the resulting three-dimensionally shaped object exhibit a particularly higher mechanical strength.

Other Constituents

The liquid binder may further contain other constituents. Examples of such constituents include a coloring agent such as a pigment or a dye, a dispersant, a surfactant, a polymerization initiator, a polymerization promoter, a solvent, a penetration enhancer, a wetting agent (moisturizing agent), a fixing agent, a fungicide, a preservative, an antioxidant, an ultraviolet absorbent, a chelating agent, a pH adjuster, a thickener, a filler, an aggregation inhibitor, and an antifoaming agent.

In particular, a liquid binder containing a coloring agent enables the production of a three-dimensionally shaped object having a color corresponding to the color of the coloring agent.

Also, a liquid binder containing a pigment as the coloring agent enhances the resistance to light of the resulting three-dimensionally shaped object. The pigment may be selected from inorganic pigments and organic pigments.

Exemplary inorganic pigments include carbon blacks (for example, C. I. Pigment 7), such as furnace black, lamp black, acetylene black, and channel black; iron oxides, and titanium oxide. These may be used singly or in combination. In order to give a favorable white color, the inorganic pigment is desirably titanium oxide.

Exemplary organic pigments include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments. These organic pigments may be used singly or in combination.

If the liquid binder contains a pigment, the pigment preferably has an average particle size of 300 nm or less, more preferably in the range of 50 nm to 250 nm. Such a pigment exhibits particularly high dispersion stability in the liquid binder and allows the liquid binder to be stably ejected, and, in addition, allows a high-quality image to be formed.

Examples of the dye include acid dyes, direct dyes, reactive dyes, and basic dyes. These dyes may be used singly or in combination.

If the liquid binder contains a coloring agent, the coloring agent content in the liquid binder is preferably in the range of 1% by mass to 20% by mass. The coloring agent with such a content exhibits satisfactorily hiding ability and color reproducibility.

If the liquid binder contains a titanium oxide as the coloring agent, the titanium oxide content in the liquid binder is preferably in the range of 12% by mass to 18% by mass, and more preferably in the range of 14% by mass to 16% by mass. Such a liquid binder exhibits satisfactory hiding ability.

If the liquid binder contains a pigment, it is advantageous to add a dispersant to the liquid binder so that the pigment can be dispersed more satisfactorily. Consequently, the pigment can be prevented more effectively from being unevenly distributed and thus reducing the mechanical strength.

The dispersant may be, but is not limited to, a compound that is generally used for preparing a pigment dispersion, such as a polymer dispersant. Examples of polymer dispersant include polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. At least one of these dispersants may be used as the main constituent. The polymer dispersant is commercially available, and exemplary commercially available dispersants include AJISPER series produced by Ajinomoto Fine-Techno, Solsperse series such as Solsperse 36000, available from Noveon, Disper BYK series produced by BYK, and DISPARLON series produced by Kusumoto Chemicals.

If the liquid binder contains a surfactant, the abrasion resistance of the resulting three-dimensionally shaped object can be increased. Examples of the surfactant include, but are not limited to, silicone surfactants, such as polyester-modified silicones and polyether-modified silicones. More specifically, polyether-modified polydimethyl siloxane and polyester-modified polydimethyl siloxane are suitable. The surfactant is commercially available, and examples thereof include BYK-347, BYK-348, BYK-UV 3500, BYK-UV 3510, BYK-UV 3530, and BYK-UV 3570 (each produced by BYK).

The liquid binder may contain a solvent. Since the solvent can appropriately adjust the viscosity of the liquid binder, the use of a solvent allows the liquid binder to be ejected stably by an ink jet method even if the liquid binder contains a viscous constituent.

Examples of the solvent include (poly)alkylene glycol monoalkyl ethers, such as ethylene glycol monomethyl ether, ethylene glycol monoethyl ether, propylene glycol monomethyl ether, and propylene glycol monoethyl ether; acetic acid esters, such as ethyl acetate, n-propyl acetate, isopropyl acetate, n-butyl acetate, and isobutyl acetate; aromatic hydrocarbons, such as benzene, toluene, and xylene; ketones, such as methyl ethyl ketone, acetone, methyl isobutyl ketone, ethyl n-butyl ketone, diisopropyl ketone, and acetyl acetone; and alcohols, such as ethanol, propanol, and butanol. These solvents may be used singly or in combination.

The viscosity of the liquid binder is preferably in the range of 10 mPa·s to 25 mPa·s, and more preferably 15 mPa·s to 20 mPa·s. Such a liquid binder can be stably ejected by an ink jet method. The viscosity mentioned herein is a value measured at 25° C. with an E-type viscometer VISCONIC ELD (manufactured by Tokyo Keiki). For producing the three-dimensionally shaped object, a plurality of liquid binders may be used.

For example, a liquid binder containing a coloring agent (color ink) and a liquid binder not containing a coloring agent (clear ink) may be used. In this instance, the liquid binder containing a coloring agent may be used for the region that will determine the color of the appearance of the resulting three-dimensionally shaped object, and the liquid binder not containing a coloring agent may be used for the region that does not determine the color of the appearance. A plurality of liquid binders may be used in such a manner that a region (coating layer) is formed using a liquid binder not containing a coloring agent on the outer surface of the portion of the three-dimensionally shaped object, formed using a liquid binder containing a coloring agent.

A plurality of liquid binders containing different coloring agents may be used. Combinations of these liquid binders can expand the color reproduction region that can be expressed.

If a plurality of liquid binders are used, it is advantageous to use at least cyan, magenta and yellow liquid binders. Combinations of these liquid binders can expand the color reproduction region that can be further expressed.

A combined used of a white liquid binder with other color liquid binders enables the production of a three-dimensionally shaped object including a first region to which the white liquid binder has been applied, and a region overlapping the first region and extending toward the outer surface from the first region, to which a liquid binder other than white has been applied. In this instance, the first region to which the white liquid binder has been applied exhibits hiding ability, thus increasing the chroma of the resulting three-dimensionally shaped object.

5. Three-Dimensionally Shaped Object

The three-dimensionally shaped object of an embodiment of the invention is produced by the above-described method. The three-dimensionally shaped object has a high mechanical strength and a high dimensional accuracy.

The three-dimensionally shaped object may be used for, but is not limited to, appreciation or exhibition objects such as dolls and figures, and medical devices such as implants.

The three-dimensionally shaped object of an embodiment of the invention may also be used as any of a prototype, a mass-produced product and a made-to-order article.

While the invention has been described with reference to exemplary embodiments, it is to be understood that the invention is not limited to the disclosed embodiments.

For example, the apparatus disclosed herein has a collecting portion and a shaping portion apart from the collecting portion. These portions however may be integrated in one body without being limited to the disclosed embodiment. In this instance, layers 1 may be formed by moving the collecting portion and the shaping portion instead of moving the squeegee.

The method for producing a three-dimensionally shaped object, described herein may further include operations for pretreatment and after-treatment as required. The pretreatment may be an operation of cleaning the shaping stage.

The after-treatment may be cleaning, coloring, or shape-adjustment for, for example, deburring, or forming a coating layer. Also, as an operation for completing the curing of the UV curable resin, the UV curable resin may be irradiated with light or heated for completely curing the uncured portion of the UV curable resin.

In the embodiments disclosed herein, the liquid binder is applied to all the layers formed. The liquid binder is however not necessarily applied to all the layers. For example, the layer directly on the shaping stage may be a sacrifice layer to which the liquid binder is not applied.

The embodiments disclosed herein mainly describes a process using an ink jet method for ejection. The ejection operation may be performed by any other method (for example, printing).

The entire disclosure of Japanese Patent Application No. 2014-238030, filed Nov. 25, 2014 is expressly incorporated by reference herein.

What is claimed is:

1. A method for producing a three-dimensionally shaped object by stacking layers, the method comprising:
    forming each layer using a three-dimensional shape composition containing particles;
    measuring the thickness of the layer; and ejecting a liquid binder onto the layers, the liquid binder containing a binding agent capable of binding the particles to each other, wherein the amount of the liquid binder to be ejected per unit area of the layer when viewed from above is adjusted according to the result of the measuring.

2. The method according to claim 1, wherein the amount of the liquid binder to be ejected is adjusted by varying the number of droplets of the liquid binder to be ejected.

3. The method according to claim 1, wherein the amount of the liquid binder to be ejected is adjusted by varying the weight of droplets of the liquid binder to be ejected.

4. The method according to claim 1, wherein the measuring of the thickness is performed with a non-contact measuring device.

5. The method according to claim 1, further comprising heating the layer before the measuring, wherein the three-dimensional shape composition contains a solvent, and the solvent in the layer, in part, is removed by the heating.

6. The method according to claim 1, further comprising irradiating with UV light the layer onto which the liquid binder has been ejected, thereby curing the binding agent, wherein the amount of irradiation per unit area of the layer when viewed from above is adjusted according to the result of the measuring.

7. An apparatus adapted to produce a three-dimensionally shaped object by stacking layers, the apparatus comprising:
a layer-forming device that forms each layer of a three-dimensional shape composition containing particles;
a thickness-measuring device that measures the thickness of the layer; and
an ejection device that ejects a liquid binder onto the layer, the liquid binder containing a binding agent capable of binding the particles to each other, the ejection device being configured to adjust the amount of the liquid binder to be ejected per unit area of the layer when viewed from above according to the thickness measured by the thickness-measuring device.

8. A three-dimensionally shaped object produced by the method as set forth in claim 1.

9. A three-dimensionally shaped object produced by the method as set forth in claim 2.

10. A three-dimensionally shaped object produced by the method as set forth in claim 3.

11. A three-dimensionally shaped object produced by the method as set forth in claim 4.

12. A three-dimensionally shaped object produced by the method as set forth in claim 5.

13. A three-dimensionally shaped object produced by the method as set forth in claim 6.

* * * * *